US010628203B1

(12) United States Patent
Ovchinnikov et al.

(10) Patent No.: US 10,628,203 B1
(45) Date of Patent: *Apr. 21, 2020

(54) FACILITATING HIBERNATION MODE TRANSITIONS FOR VIRTUAL MACHINES (71) Applicant: Parallels International GmbH, Schaffhausen (CH)

(72) Inventors: Yuri Ovchinnikov, Moscow (RU); Nikolay Dobrovolskiy, Moscow (RU); Serguei Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 12 days.

This patent is subject to a terminal disclaimer.

(21) Appl. No.: 15/888,691

(22) Filed: Feb. 5, 2018

Related U.S. Application Data

(63) Continuation of application No. 15/178,029, filed on Jun. 9, 2016, now Pat. No. 9,940,159.

(51) Int. Cl.
*G06F 9/455* (2018.01)
*G06F 1/3296* (2019.01)
*G06F 13/40* (2006.01)

(52) U.S. Cl.
CPC ........ *G06F 9/45558* (2013.01); *G06F 1/3296* (2013.01); *G06F 13/4068* (2013.01); *G06F 2009/4557* (2013.01); *G06F 2009/45579* (2013.01)

(58) Field of Classification Search
CPC .. G06F 9/45558; G06F 9/4418; G06F 1/3296; G06F 2009/45587; G06F 21/121; G06F 21/57; G06F 21/6281; G06F 9/461
See application file for complete search history.

(56) References Cited

U.S. PATENT DOCUMENTS

| 8,528,107 | B1* | 9/2013 | Ginzton | G06F 21/6281 726/29 |
| 8,533,785 | B2* | 9/2013 | Ohno | G06F 21/305 718/1 |
| 9,405,347 | B2* | 8/2016 | Wang | G06F 1/3228 |
| 2005/0060591 | A1* | 3/2005 | Yoshiyama | G06F 1/3203 713/320 |
| 2007/0234356 | A1* | 10/2007 | Martins | G06F 8/63 718/1 |
| 2009/0144570 | A1* | 6/2009 | Chen | G06F 1/3203 713/320 |

(Continued)

OTHER PUBLICATIONS

"Advanced Configuration and Power Interface Specification", Version 6.1, http://www.uefi.org/sites/default/files/resources/ACPI_6_1.pdf, Jan. 2016, 1082 pages.

(Continued)

*Primary Examiner* — Dong U Kim
(74) *Attorney, Agent, or Firm* — Lowenstein Sandler LLP (57) ABSTRACT

Systems and methods for facilitating hibernation mode transitions for virtual machines. An example method comprises: disabling modifications of a hardware configuration parameter of a virtual machine running in a hibernation state on a host computer system; and responsive to determining the hardware configuration parameter of the virtual machine has been modified, causing the virtual machine to discard, upon awakening, a previously saved memory state.

20 Claims, 5 Drawing Sheets

(56) References Cited

U.S. PATENT DOCUMENTS

| | | | | |
|---|---|---|---|---|
| 2009/0165117 A1* | 6/2009 | Brutch | G06F 21/629 | 726/14 |
| 2009/0328225 A1* | 12/2009 | Chambers | G06F 21/10 | 726/26 |
| 2011/0055830 A1* | 3/2011 | Kamay | G06F 1/3228 | 718/1 |
| 2011/0184993 A1* | 7/2011 | Chawla | G06F 9/45533 | 707/802 |
| 2011/0231680 A1* | 9/2011 | Padmanabhan | G06F 1/3209 | 713/310 |
| 2011/0246778 A1* | 10/2011 | Duane | G06F 21/57 | 713/176 |
| 2012/0005676 A1* | 1/2012 | Nakajima | G06F 8/65 | 718/1 |
| 2012/0054740 A1* | 3/2012 | Chakraborty | G06F 9/45558 | 718/1 |
| 2012/0079480 A1* | 3/2012 | Liu | G06F 11/3409 | 718/1 |
| 2012/0117564 A1* | 5/2012 | Friebel | G06F 9/45541 | 718/1 |
| 2013/0174151 A1* | 7/2013 | Nakajima | G06F 9/461 | 718/1 |
| 2013/0247033 A1* | 9/2013 | Sawhney | G06F 21/50 | 718/1 |
| 2014/0181811 A1* | 6/2014 | Tsirkin | G06F 9/45558 | 718/1 |
| 2017/0308154 A1* | 10/2017 | Young | G06F 1/3296 | |

OTHER PUBLICATIONS

USPTO, Notice of Allowance for U.S. Appl. No. 15/178,029, dated Nov. 30, 2017.

* cited by examiner

FACILITATING HIBERNATION MODE TRANSITIONS FOR VIRTUAL MACHINES

RELATED APPLICATIONS

This application is a continuation of U.S. patent application Ser. No. 15/178,029 filed on Jun. 9, 2016, titled "Facilitating Hibernation Mode Transitions for Virtual Machines," the entire content of which is incorporated by reference herein.

TECHNICAL FIELD

The present disclosure is generally related to computer systems, and is specifically related to systems and methods for facilitating hibernation mode transitions for virtual machines.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for facilitating hibernation mode transitions for virtual machines.

Power management features of modern computing devices, ranging from smartphones to rack-mounted servers, include the ability of a computing device to transition to a reduced power consumption state, which may be broadly characterized by significantly reduced power consumption due to suspended processor activity. Particular features of such reduced power consumption states may be defined by various standards and specifications. For example, the Advanced Configuration and Power Interface (ACPI) Specification that provides an open standard that operating systems can use for computer hardware discovery, configuration, power management, and monitoring, defines a global sleeping state (G1), within which four states, S1 through S4 are defined.

In S1 state, which is commonly referred to as Power on Suspend (POS), processor caches are flushed, and the processors stops executing instructions. The power to the processors and the main memory is maintained. Devices that do not indicate that they must remain on may be powered off.

In S2 state, the processors are powered off. Dirty caches are flushed to the main memory.

In S3 state, which is commonly referred to as Standby, Sleep, or Suspend to RAM (STR), the main memory remains powered.

In S4 state, which is commonly referred to as Hibernation or Suspend to Disk, the content of the main memory is saved to non-volatile memory such as a hard drive, and the system is powered down.

In a virtualized environment, both the host system and a virtual machine may transition into a hibernation state. Methods of the present disclosure facilitate transitioning to a hibernation state by virtual machines, rather than by the host system. Although the examples of the present disclosure are focused on S4 state, the methods described herein may be also performed with respect to other reduced power consumption states to which a virtual machine may transition, including non-ACPI compliant hibernation states.

Hibernating the virtual machine may by preferred over hibernating the host system because, while effectively reducing the power consumption by the host system, it may also facilitate the faster awakening of the virtual machine. However, awakening of a hibernating virtual machine may be hindered by a hardware configuration modification that may have occurred while the virtual machine was hibernating (e.g., the virtualization manager has modified the number of virtual central processing units (vCPU) allocated to the virtual machine, the physical memory map presented to the virtual machine, and/or configuration of peripheral devices associated with the virtual machine). Consequences of such a modification, by virtue of it being unbeknownst to the virtual machine, may range from forcing the virtual machine to go through the boot sequence to crashing the virtual machine. Therefore, common virtualization implementations often prevent virtual machines from transitioning into the hibernating state.

The present disclosure addresses this and certain other deficiencies by providing methods for facilitating hibernation mode transitions for virtual machines. In accordance with one or more aspects of the present disclosure, the host system may be prevented from performing certain modifications of the virtual machine hardware configuration if an active user session currently exists in the virtual machine. "User session" herein shall refer to a lifetime of one or more processes owned and/or initiated by a user following a user login event. In another illustrative example, a modification of the virtual machine hardware configuration may be allowed in the absence of an active user session, but the virtual machine may be subsequently forced to discard the previously saved memory state in order to prevent the virtual machine from crashing.

Various aspects of the above referenced methods and systems are described in details herein below by way of examples, rather than by way of limitation.

Figure 1:
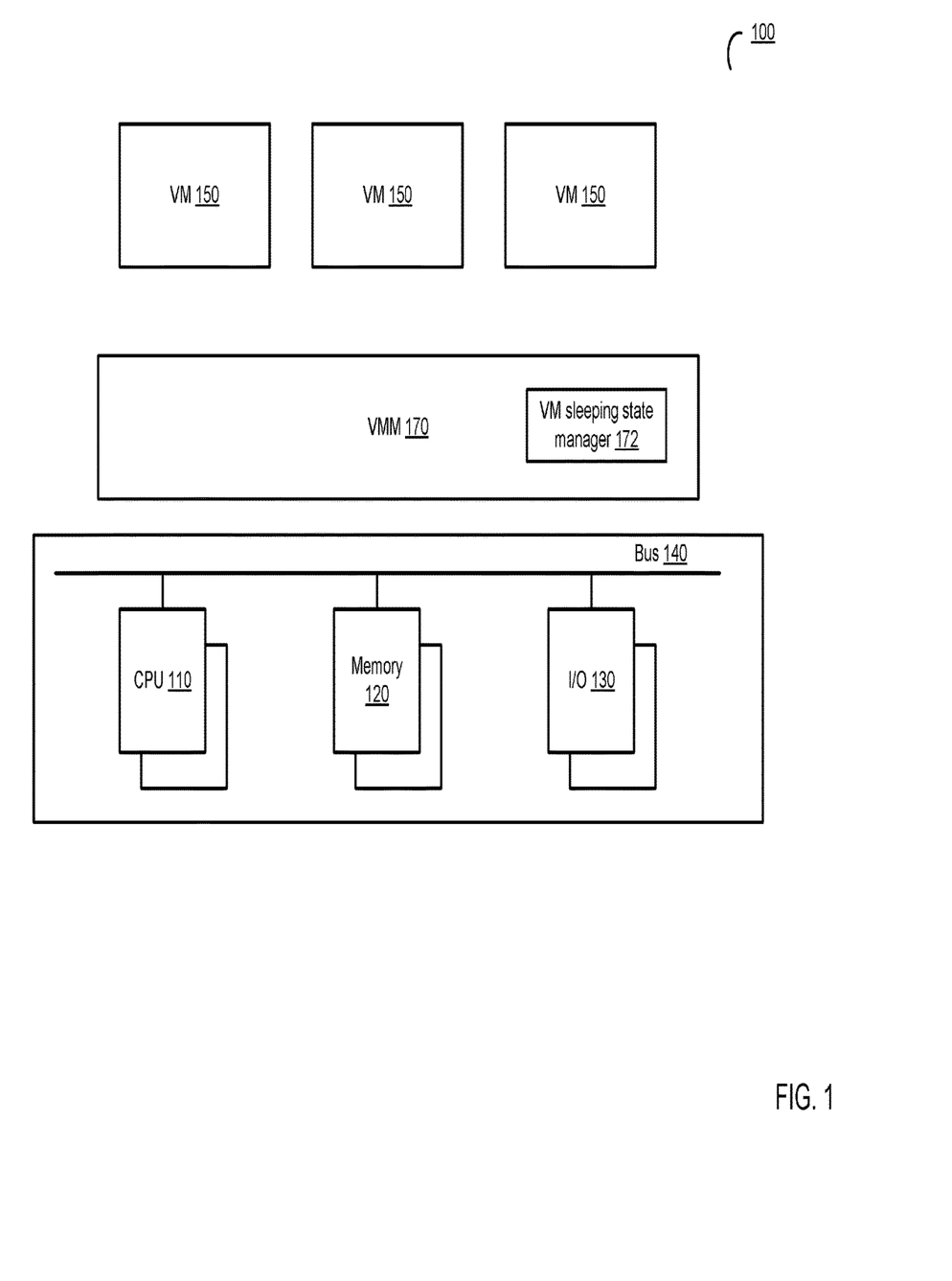
FIG. 1 depicts a high-level diagram of an example computer system 100 operating in accordance with one or more aspects of the present disclosure.

FIG. 1 depicts a high-level diagram of an example computer system 100 operating in accordance with one or more aspects of the present disclosure. The computer system 100 may include one or more central processing units (CPU) 110, also referred to as "processors" herein, communicatively coupled to one or more memory devices 120 and one or more input/output (I/O) devices 130 via a system bus 140.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device providing an interface between a processor and an external device capable of inputting and/or outputting binary data. In an illustrative example, an I/O device may be provided by a network interface controller (NIC) or a block I/O device, such as a hard disk.

The computer system 100 may execute one or more virtual machines 150 controlled by a virtual machine manager (VMM) 170. In various implementations, the VMM 170 may implement the methods for facilitating hibernation mode transitions for virtual machines described herein. Alternatively, the methods described herein and/or each of its individual functions, routines, subroutines, or operations may be performed by other software and/or hardware components associated with the host computer system 100 and/or a virtual machine 150.

The virtual machine 150 may initiate a transition into a sleeping state (e.g., S4 state) by saving the platform context and the user session state in a non-volatile memory, executing a prepare-to-sleep control method and programming a control register with the identified of the desired sleeping state. In the sleeping state, when one of the enabled wake events occurs, the virtual machine will transition the system back to the working state.

As noted herein above, the methods described herein facilitate hibernation mode transitions by virtual machine by preventing the host system from performing certain modifications of the virtual machine hardware configuration if an active user session currently exists in the virtual machine. In certain implementations, a user session may be detected by a software component that is executed by the virtual machine and notifies the VMM of any login or logout event. Alternatively, a user session may be detected by a software component that is executed by the host computer system and tracks the virtual machine interactions with certain peripheral devices (e.g., with virtual network interface controllers associated with the virtual machine). In an illustrative example, the software component may detect a login event responsive to matching a pre-defined pattern to a message transmitted over the network by a network interface controller associated with the virtual machine (e.g., a user authentication request transmitted by the virtual machine to an external authentication service). In another illustrative example, the software component may detect a logout event responsive to matching another pre-defined pattern to a message transmitted over the network by a network interface controller associated with the virtual machine (e.g., a user logout request transmitted by the virtual machine to a domain controller service).

Responsive to receiving a login event notification, the VMM may set an active user session flag for the virtual machine. Such a flag may be cleared responsive to receiving a notification of a logout by the user associated with the session. The active session flag and the associated user identifier may be stored by the VMM in the virtual machine configuration data area.

Figure 2:
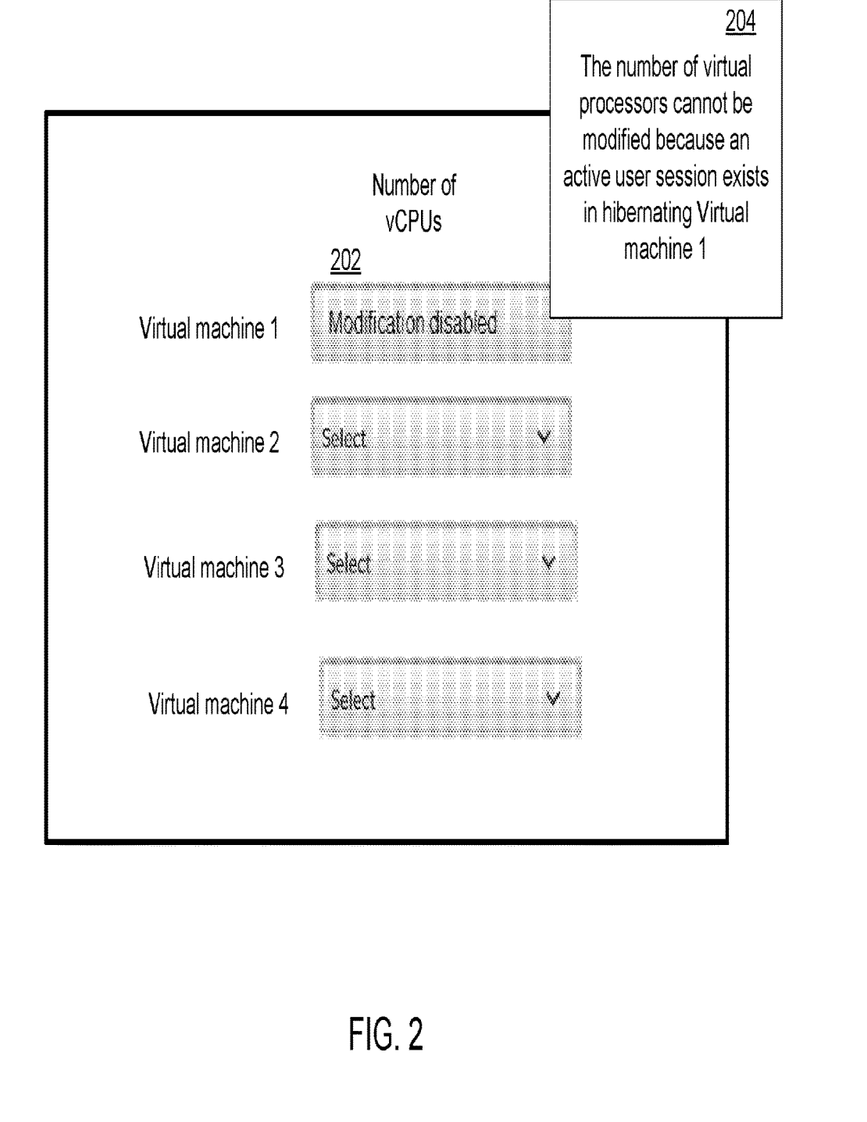
FIG. 2 depicts an example graphical user interface (GUI) employed for modifying the virtual machine hardware configuration, in accordance with one or more aspects of the present disclosure.

In order to disable certain modifications of the virtual machine hardware configuration in the presence of an active user session in the virtual machine, the host computer system may, in an illustrative example, disable the elements of the graphical user interface (GUI) that are employed for modifying the virtual machine hardware configuration, as schematically illustrated by FIG. 2. In the example of FIG. 2, the drop-down control 202, which accepts the user input specifying the number of virtual processors allocated to the virtual machine, is disabled. In certain implementations, a hover box 204 may be rendered when the user moves the mouse pointer over the drop-down control 202, advising the user that the number of virtual processors cannot be modified because an active user session exists in the hibernating virtual machine.

While FIG. 2 schematically illustrates disabling the user interface control modifying the number of virtual processors that are associated with the virtual machine, in other illustrative examples, the host computer system may prevent various other virtual machine hardware configuration parameters from being modified in the presence of an active user session in the virtual machine, including the physical memory map presented to the virtual machine and/or configuration of peripheral devices associated with the virtual machine.

Furthermore, while the above-described examples disable the elements of the graphical user interface (GUI) that are employed for modifying the virtual machine hardware configuration, other methods of preventing certain modifications of the virtual machine hardware configuration in the presence of an active user session in the virtual machine may be implemented. In an illustrative example, the host computer system may intercept the virtualization API calls that modify the virtual machine hardware configuration, and may return an error status to the caller response to detecting an active user session in the virtual machine whose hardware configuration is being modified.

As noted herein above, the methods described herein may force the hibernating virtual machine to discard, upon awakening, the previously saved memory state if the hardware configuration of the hibernating virtual machine has been allowed to be modified due to the absence of an active user session. The hardware configuration parameters whose modification may trigger discarding the virtual machine state upon the virtual machine awakening include the number of virtual processors, the physical memory map presented to the virtual machine and/or configuration of peripheral devices associated with the virtual machine.

Figure 3:
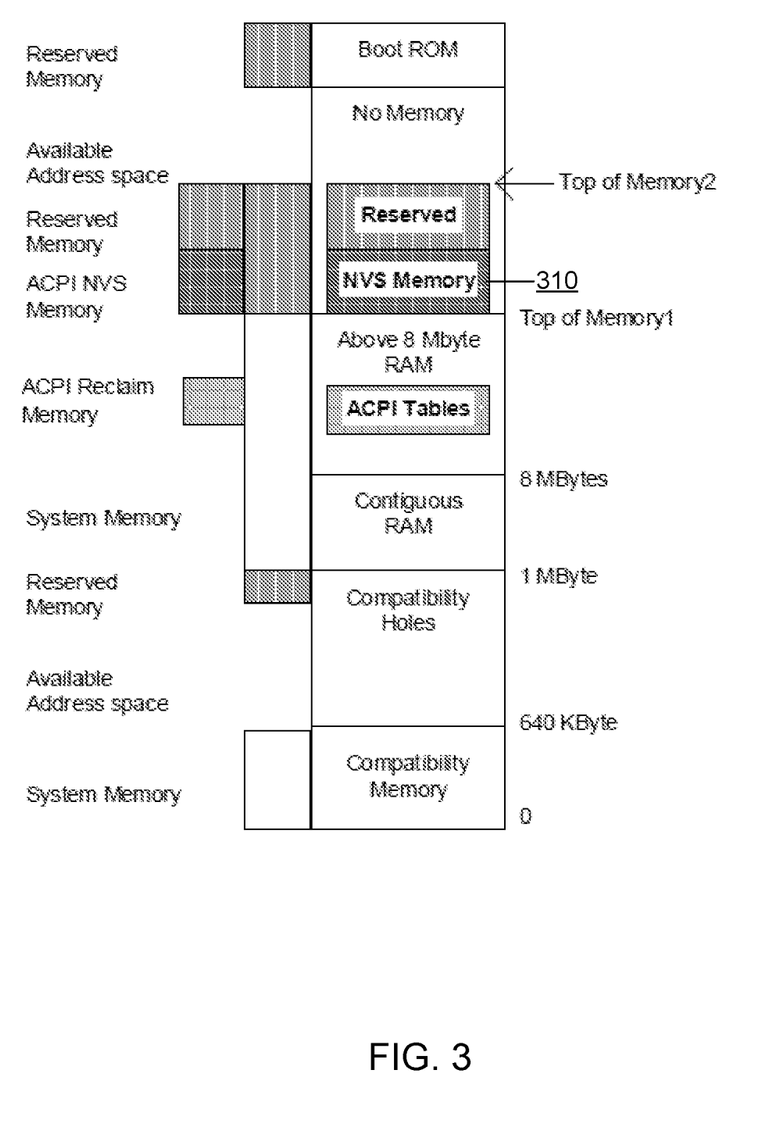
FIG. 3 depicts a virtual machine memory map, in accordance with one or more aspects of the present disclosure.

In order to force the hibernating virtual machine to discard, upon awakening, the previously saved memory state, the host computer system may, in an illustrative example, modify boundaries of certain memory regions associated with the virtual machine. As schematically illustrated by FIG. 3, the host computer system may, responsive to determining that a certain modification of the hardware configuration of the hibernating virtual machine has been performed, move the Top of Memory 2 pointer indicating the upper address of the non-volatile storage (NVS) region 310 by one memory page up or down. In an illustrative example, upwards and downwards movement of the Top of Memory 2 pointer may be performed in an alternating manner, such that multiple consecutive changes of the virtual machine memory map would lead to oscillations, rather than drift, of the Top of Memory 2 pointer. Upon awakening, the virtual machine will validate the NVS image file (i.e., the file, in which the content of the NVS memory region is stored) against the current memory map. In an illustrative example, the virtual machine may perform the call to the Query System Address Map Interface call to receive the current memory map parameters. Responsive to determining that the size of the NVS image file does not match the size of the NVS region 310, the virtual machine will not restore the system context and may boot from scratch.

Figure 4:
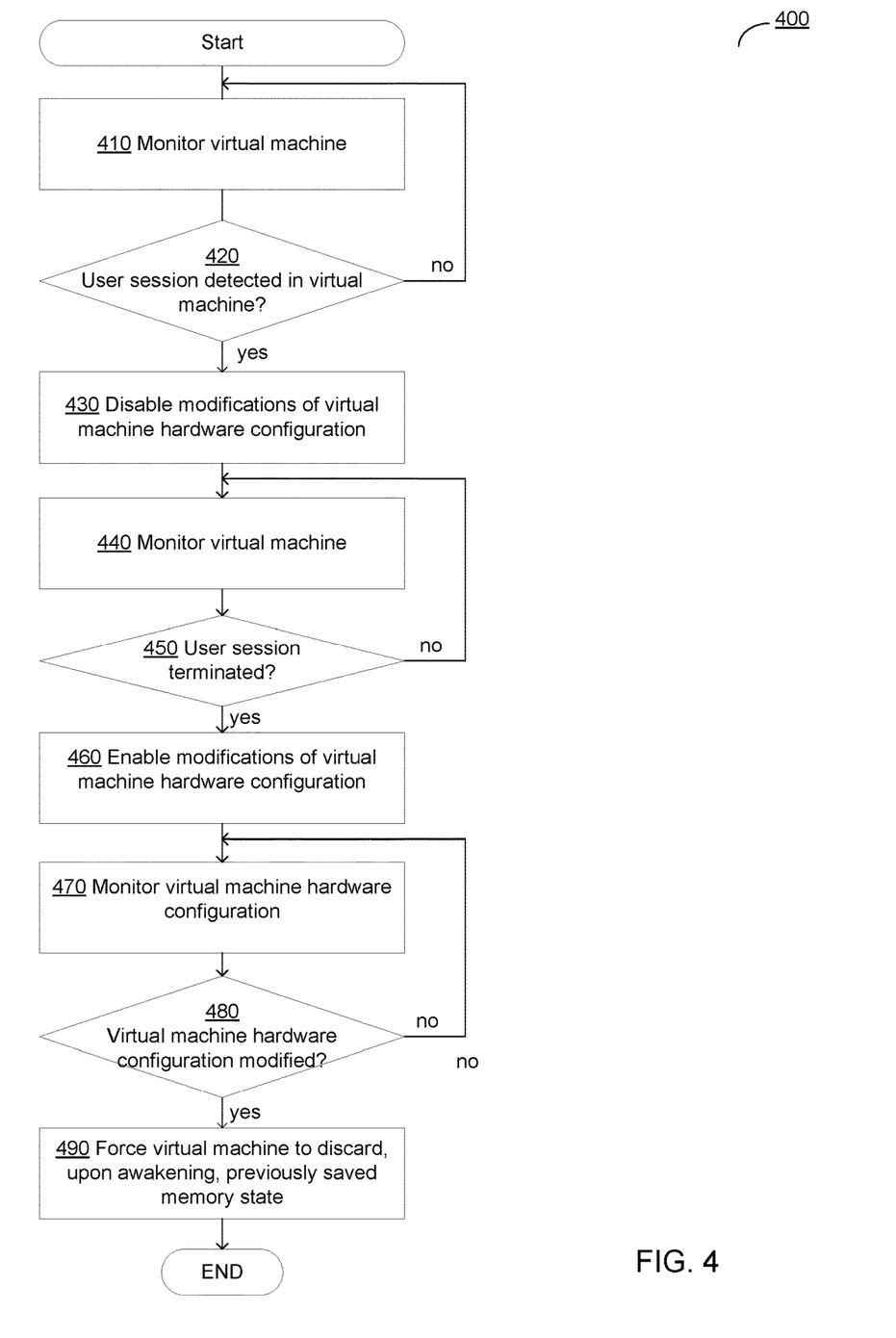
FIG. 4 depicts a flow diagram of a method for facilitating hibernation mode transitions for virtual machines, in accordance with one or more aspects of the present disclosure.

FIG. 4 depicts a flow diagram of one illustrative example of method 400 for facilitating hibernation mode transitions for virtual machines, in accordance with one or more aspects of the present disclosure. Method 400 and/or each of its individual functions, routines, subroutines, or operations may be performed by one or more processing devices of the computer system (e.g., computer system 100 of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device implementing the method may monitor a virtual machine in order to detect a possible active user session. As noted herein above, a user session may be detected by a software component that is executed by the virtual machine and notifies the VMM of any login or logout event. Alternatively, a user session may be detected by a software component that is executed by the host computer system and tracks the virtual machine interactions with certain peripheral devices (e.g., with virtual network interface controllers associated with the virtual machine), as described in more details herein above.

Responsive to determining, at block 420, that an active user session exists in the virtual machine operating in the sleeping state (e.g., S4 state), the processing device may, at block 430, disable modifications of certain parameters of the virtual machine hardware configuration. As noted herein above, such parameters may include the number of virtual processors allocated to the virtual machine, parameters of the physical memory map presented to the virtual machine, and/or configuration parameters of peripheral devices associated with the virtual machine.

At block 440, the processing device may continue monitoring the virtual machine in order to detect a possible termination of previously detected active the user session. Responsive to determining, at block 450, that the user session has been terminate, the processing device may, at block 460, re-enable modifications of the parameters of the virtual machine hardware configuration.

At block 470, the processing device may monitor the virtual machine hardware configuration in order to detect possible modifications of certain hardware configuration parameters. As noted herein above, such parameters may include the number of virtual processors allocated to the virtual machine, parameters of the physical memory map presented to the virtual machine, and/or configuration parameters of peripheral devices associated with the virtual machine.

Responsive to determining, at block 480, that a certain hardware configuration parameter has been modified, the processing device may, at block 490, force the hibernating virtual machine to discard, upon awakening, the previously saved memory state. In an illustrative example, the processing device may modify boundaries of certain memory regions associated with the virtual machine, e.g., move the pointer referencing the upper address of the non-volatile storage (NVS) region by one memory page up or down, as described in more details herein above. Responsive to completing the operations referenced by block 490, the method may terminate.

Figure 5:
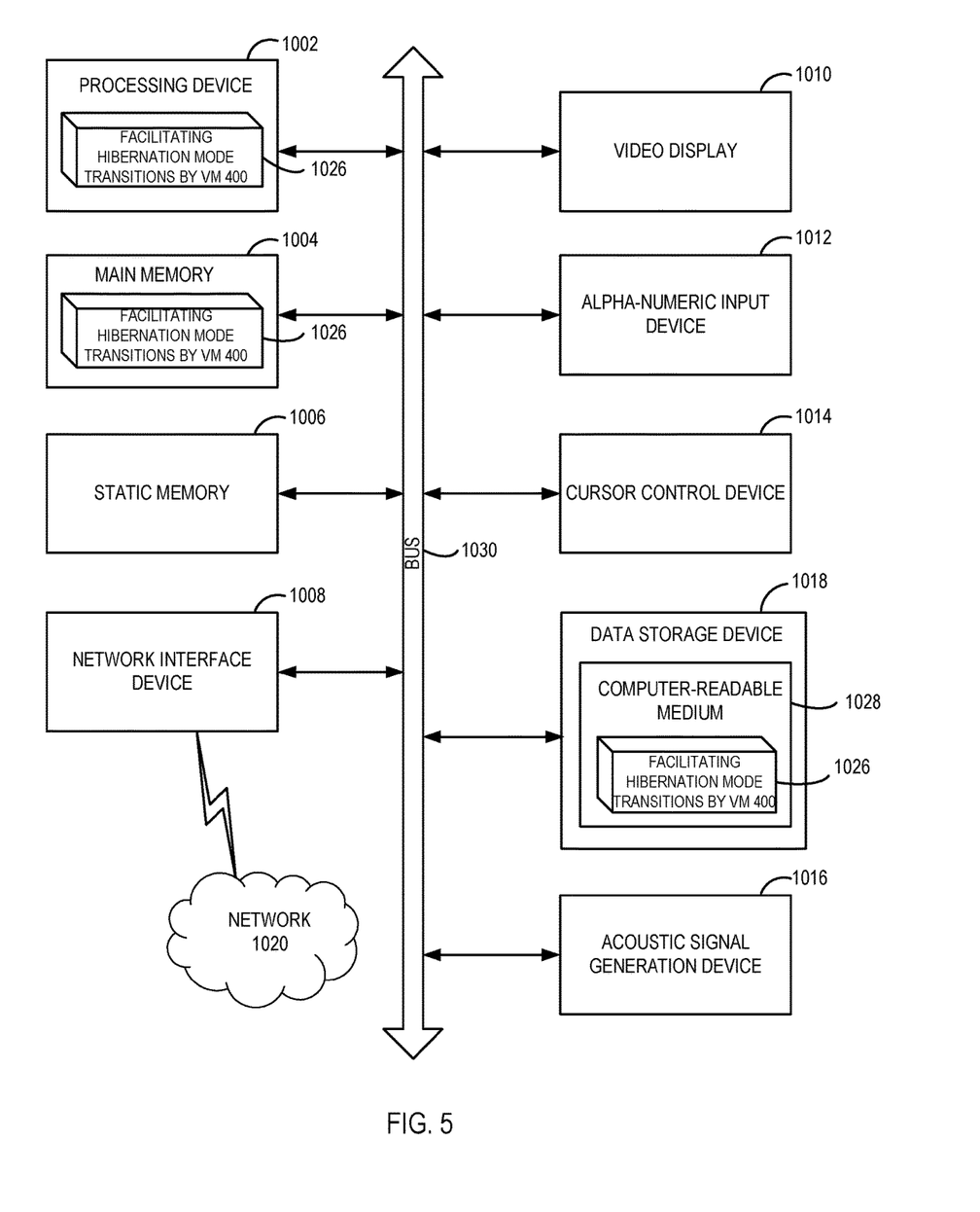
FIG. 5 depicts a block diagram of an example computer system operating in accordance with one or more aspects of the present disclosure.

FIG. 5 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 400 for facilitating hibernation mode transitions for virtual machines, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 400 for facilitating hibernation mode transitions for virtual machines, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    saving a memory state of a virtual machine to produce a saved memory state, wherein the virtual machine is running in an active state on a host computer system;
    causing the virtual machine to transition to a hibernation state;
    determining that while the virtual machine was in the hibernation state, a hardware configuration parameter of the virtual machine has been modified; and
    responsive to the determining, causing the virtual machine to discard, upon awakening, the saved memory state.

2. The method of claim 1, further comprising:
responsive to the determining, modifying a boundary of a memory region associated with the virtual machine.

3. The method of claim 1, further comprising:
responsive to the determining, moving, upwards by one memory page, a pointer to an upper address of an Advanced Configuration Power Interface (ACPI) non-volatile storage region.

4. The method of claim 1, further comprising:
responsive to the determining, moving, downwards by one memory page, a pointer to an upper address of an ACPI non-volatile storage region.

5. The method of claim 1, further comprising:
responsive to detecting an active user session associated with the virtual machine running in the active state, causing deactivation of a user interface control employed for modifying the hardware configuration parameter.

6. The method of claim 5, further comprising:
responsive to detecting termination of the active user session associated with the virtual machine running in the active state, enabling modification of the hardware configuration parameter of the virtual machine.

7. The method of claim 1, further comprising:
responsive to detecting an active user session associated with the virtual machine running in the active state, intercepting a virtualization application programming interface (API) call attempting to modify the hardware configuration parameter.

8. The method of claim 1, wherein the hardware configuration parameter is represented by one of: a number of virtual processors associated with the virtual machine, a memory map associated with the virtual machine, or a configuration parameter of a peripheral device associated with the virtual machine.

9. A system, comprising:
a memory; and
a processing device coupled to the memory, the processing device configured to:
save a memory state of a virtual machine to produce a saved memory state, wherein the virtual machine is running in an active state on a host computer system associated with the processing device;
cause the virtual machine to transition to a hibernation state;
determine that while the virtual machine was in the hibernation state, a hardware configuration parameter of the virtual machine has been modified; and
responsive to the determining, cause the virtual machine to discard, upon awakening, the saved memory state.

10. The system of claim 9, wherein the processing device is further configured to:
responsive to detecting an active user session associated with the virtual machine running in the active state, cause deactivation of a user interface control employed for modifying the hardware configuration parameter.

11. The system of claim 9, wherein the hibernation state of the virtual machine is represented by an Advanced Configuration Power Interface (ACPI) S4 state.

12. The system of claim 9, wherein the hardware configuration parameter is represented by one of: a number of virtual processors associated with the virtual machine, a memory map associated with the virtual machine, or a configuration parameter of a peripheral device associated with the virtual machine.

13. The system of claim 9, wherein the processing device is further configured to:
responsive to the determining, modify a boundary of a memory region associated with the virtual machine.

14. The system of claim 9, wherein the processing device is further configured to:
responsive to the determining, modifying a pointer to an upper address of an ACPI non-volatile storage region.

15. The system of claim 9, wherein the processing device is further configured to:
responsive to detecting termination of an active user session associated with the virtual machine running in the active state, enable modification of the hardware configuration parameter of the virtual machine.

16. A non-transitory computer-readable storage medium comprising executable instructions that, when executed by a host computer system, cause the host computer system to:
save a memory state of a virtual machine to produce a saved memory state, wherein the virtual machine is running in an active state on the host computer system;
cause the virtual machine to transition to a hibernation state;
determining that while the virtual machine was in the hibernation state, a hardware configuration parameter of the virtual machine has been modified; and
responsive to the determining, cause the virtual machine to discard, upon awakening, the saved memory state.

17. The non-transitory computer-readable storage medium of claim 16, wherein a current state of the virtual machine is represented by an Advanced Configuration Power Interface (ACPI) S4 state.

18. The non-transitory computer-readable storage medium of claim 16, wherein the hardware configuration parameter is represented by one of: a number of virtual processors associated with the virtual machine, a memory map associated with the virtual machine, or a configuration parameter of a peripheral device associated with the virtual machine.

19. The non-transitory computer-readable storage medium of claim 16, further comprising executable instructions to cause the host computer system to:
responsive to the determining, modify a boundary of a memory region associated with the virtual machine.

20. The non-transitory computer-readable storage medium of claim 16, further comprising executable instructions to cause the host computer system to:
responsive to determining the hardware configuration parameter of the virtual machine has been modified, modify a pointer to an upper address of an ACPI non-volatile storage region.

* * * * *